United States Patent
Cottingham et al.

(10) Patent No.: US 8,687,394 B2
(45) Date of Patent: Apr. 1, 2014

(54) AIRCRAFT POWER SUPPLY AND METHOD OF OPERATING THE SAME

(75) Inventors: John DeWitte Cottingham, Anderson, SC (US); James R. Berliner, Easley, SC (US)

(73) Assignee: Champion Aerospace LLC, Liberty, SC (US)

(*) Notice: Subject to any disclaimer, the term of this patent is extended or adjusted under 35 U.S.C. 154(b) by 0 days.

(21) Appl. No.: 12/607,090

(22) Filed: Oct. 28, 2009

(65) Prior Publication Data

US 2010/0277960 A1 Nov. 4, 2010

Related U.S. Application Data

(60) Provisional application No. 61/109,055, filed on Oct. 28, 2008.

(51) Int. Cl.
*H02M 7/06* (2006.01)
*H02M 7/08* (2006.01)

(52) U.S. Cl.
USPC .................................. 363/126; 363/82

(58) Field of Classification Search
USPC ........ 363/69, 75, 77, 80, 82, 126, 129, 89, 90
See application file for complete search history.

(56) References Cited

U.S. PATENT DOCUMENTS

| | | | | |
|---|---|---|---|---|
| 3,621,374 A | * | 11/1971 | Kettler | 323/343 |
| 3,931,563 A | * | 1/1976 | Stacey | 363/10 |
| 4,342,076 A | * | 7/1982 | Rosswurm et al. | 363/56.07 |
| 4,733,158 A | | 3/1988 | Marchione et al. | |
| 5,162,982 A | * | 11/1992 | Mentler | 363/26 |
| 5,808,454 A | * | 9/1998 | Chung | 323/255 |
| 5,898,581 A | * | 4/1999 | Liu | 363/53 |
| 6,366,474 B1 | * | 4/2002 | Gucyski | 363/20 |
| 7,542,316 B2 | * | 6/2009 | Nakahori | 363/125 |
| 7,859,870 B1 | * | 12/2010 | Schutten et al. | 363/56.02 |
| 2005/0169025 A1 | | 8/2005 | Huang et al. | |
| 2007/0236969 A1 | | 10/2007 | Cottingham, III | |

FOREIGN PATENT DOCUMENTS

| | | |
|---|---|---|
| DE | 2347743 A1 | 4/1975 |
| EP | 1921391 A1 | 5/2008 |
| JP | 10080143 | 3/1998 |
| JP | 2002281757 | 9/2002 |

OTHER PUBLICATIONS

John DeWitte Cottingham III, P.E., William Bassett and George Melendez, "Aircraft DC Power Quality Characteristics of a PCTRU", Copyright © 2008 SAE International, 7 pages.
UK Search Report for Application No. GB0705809.2, Jun. 12, 2007, 1 page.
Abraham Pressman, "Switching and Linear Power Supply", 1988, Power Converter Design, Switchtronix Press, 9th printing, pp. 130-133.
UK Search Report for Application No. GB0918842.6, Feb. 12, 2010, 4 pages.

* cited by examiner

*Primary Examiner* — Adolf Berhane
*Assistant Examiner* — Nusrat Quddus
(74) *Attorney, Agent, or Firm* — Reising Ethington P.C.

(57) ABSTRACT

An aircraft power supply for providing DC power with improved power quality characteristics. The aircraft power supply includes a transformer control system that can use closed-loop feedback from a DC power output to control switches that can short primary windings turns of a step-down transformer. By shorting turns in the primary, the transformer control system can control or manipulate the turns ratio in the transformer and compensate for decreases in the DC power output.

13 Claims, 3 Drawing Sheets

US 8,687,394 B2

AIRCRAFT POWER SUPPLY AND METHOD OF OPERATING THE SAME

CROSS-REFERENCE TO RELATED APPLICATION

This application claims the benefit of U.S. Provisional Application No. 61/109,055, filed Oct. 28, 2008, the entire contents of which are hereby incorporated by reference.

TECHNICAL FIELD

This invention relates generally to power supplies and, more particularly, to aircraft power supplies that provide DC power.

BACKGROUND

Aircraft electrical systems usually include electrical components, devices, equipment, etc. that require certain power quality characteristics. For example, certain electrical components may not function properly if there are electrical disturbances in the DC power supply. Electrical disturbances can include a wide range of phenomenon, including power interruptions, high voltage transients, low voltage transients, and more.

The power quality characteristics—for example, voltage regulation (VR), ripple voltage, susceptibility to power interruptions, voltage transients, etc.—that are experienced during testing can vary dramatically from those experienced during actual aircraft operation. During testing, the DC power can be provided by a programmable power supply in a highly regulated and stable environment. During actual aircraft operation, however, the DC power is usually derived from an AC generator coupled to an engine that is operating at variable speeds, from which the AC power is transformed, rectified, filtered, etc. The variable nature of this operation, as well as other factors, can result in DC power that exhibits less than ideal power quality characteristics.

SUMMARY OF THE INVENTION

In accordance with one aspect of the invention, there is provided an aircraft power supply that includes a transformer having at least one primary winding and at least one secondary winding, and transformer control system that controls the number of turns of one or more of the windings of the transformer. This control can be done in various ways, for example, by shorting one or more turns of at least one of the windings based on feedback from the output of the power supply.

In accordance with another aspect of the invention, there is provided a method of operating an aircraft power supply. The method includes the steps of converting an AC input to a DC output using a transformer, sensing a characteristic from the output side of the transformer that is representative of the DC output, comparing the sensed characteristic to a reference characteristic, and shorting one or more turns of a transformer based on the comparison. The sensed and reference characteristics can be, for example, voltages such that, for example, the DC output voltage can be sensed and compared to a reference voltage to determine whether to short one or more turns of one or more of the windings.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The aircraft power supply described herein can provide DC power with improved power quality characteristics, and can do so without compromising the reliability of the system. Although the aircraft power supply is described below in the context of an AC/DC system that uses a transformer rectifier unit (TRU) to provide DC power, it should be appreciated that other embodiments could be used as well. For instance, the aircraft power supply could provide any combination of: variable frequency AC power, constant frequency AC power, and/or DC power, and is not limited to only providing DC power.

Figure 1:
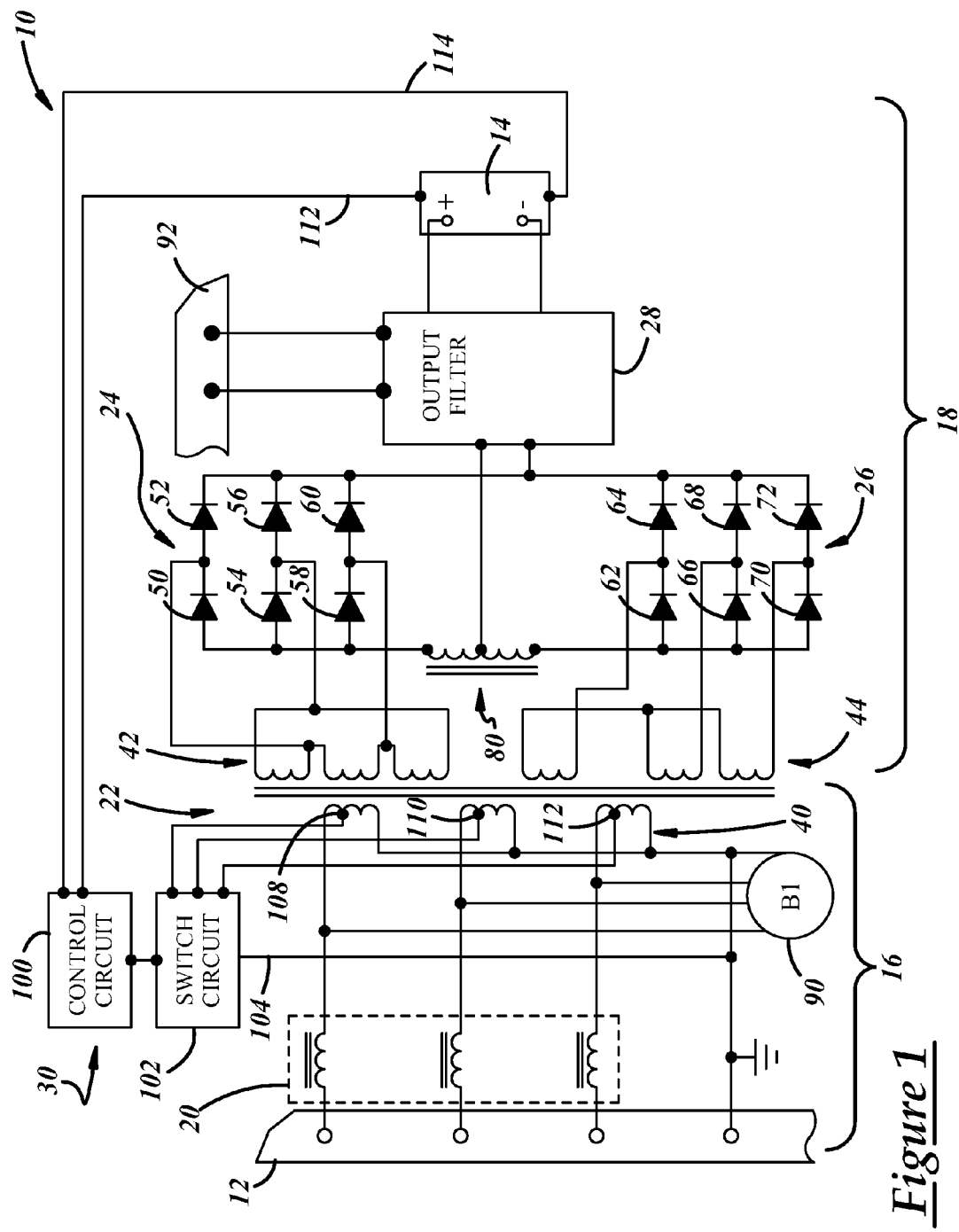
FIG. 1 is a schematic view of an exemplary aircraft power supply that provides improved power quality characteristics.

According to the exemplary embodiment shown in FIG. 1, aircraft power supply 10 receives AC power from an aircraft generator 12 and provides DC power to a DC power output 14. The AC power may be provided as a three-phase, 115 V (RMS) waveform at a constant frequency of 400 Hz, but other power inputs can be used instead. For purposes of illustration, aircraft power supply 10 is divided into a high-voltage section 16, which includes an input filter 20 and primary windings of a transformer 22, and a low-voltage section 18 which includes secondary windings of transformer 22, rectifier networks 24, 26, and an output filter 28. Aircraft power supply 10 also includes a transformer control system 30 that may use closed-loop feedback from low-voltage section 18 to control the effective number of turns in the primary windings of high-voltage section 16, as will be explained.

Input filter 20 receives AC power from aircraft generator 12 and may include a number of inductors and/or other electrical components that filter or otherwise condition the incoming AC voltage signal. In one example, an integrated drive generator (IDG) may be used to convert variable-speed mechanical output from an aircraft engine into constant-speed mechanical output, so that aircraft generator 12 can produce constant frequency (CF) electrical power. The CF electrical power, which can be a three-phase signal where each phase is separated by 120°, is then provided to input filter 20 for filtering, etc. Other aircraft generators and AC power supplies can also be used.

Transformer 22 can step-down the voltage of the AC power provided by aircraft generator 12 to a level that is more suitable for the electrical components of the aircraft. In one example, transformer 22 steps-down a 115 V (RMS) signal to a voltage of approximately 28 V (RMS); however, other voltage levels could be used. In the embodiment shown here, transformer 22 includes primary windings 40 that are arranged in a Wye configuration and secondary windings 42, 44 arranged in Delta and Wye configurations, respectively. As mentioned above, primary windings 40 may be part of high-voltage section 16 and secondary windings 42, 44 may be part of low-voltage section 18. This is, of course, only an exemplary transformer arrangement, as other winding arrangements and topologies known in the art could also be used.

Rectifier networks 24, 26 are connected to secondary windings 42, 44, respectively, and rectify the stepped-down AC power so that DC power can be provided to DC power output 14. In the embodiment shown here, rectifier networks 24, 26 are provided in the form of a bank of power diodes 50-72 that provide full-wave rectification of the stepped-down secondary voltage. The low voltage ends of rectifier networks 24, 26 are connected to ground through an interphase transformer 80, which magnetically couples the Delta- and Wye-secondary windings 42, 44 together. Interphase transformer 80 may include a pair of higher voltage taps connected to a failure sensing relay that provides converter status information to one more aircraft components, such as a FADEC system. The positive output of rectifier networks 24, 26 can be connected to DC output 14 via a bleed resistor (e.g., a 40 Ω, 25 W resistor) that limits the DC power output at no or low load conditions. Alternatively, a dummy load resistor can be used in lieu of a bleed resistor to draw sufficient current at no load so that the power supply 10 is always operating in the mostly linear portion of its inherent output voltage versus load current characteristic. This can be done as described in US Patent Application Publication No. 2007/0236969A1, the complete contents of which are hereby incorporated by reference.

Output filter 28 is connected between rectifier networks 24, 26 and DC power output 14, and may be used to improve the power quality characteristics of the power provided to the aircraft's DC power bus. According to an exemplary embodiment, output filter 28 includes two capacitors (e.g., 94 μF capacitors) separated by an inductor (e.g., a 0.1 mΩ, 0.3 μH inductor, measured at 1 kHz), and provides DC power at 28 VDC, or some other suitable voltage. In FIG. 1, a fan motor 90 can be used to cool the circuit components, a receptacle 92 may be provided (e.g., an MS3102R-20-17P), and DC power output 14 can include or be connected to a terminal board, for example. It should be appreciated that the aircraft power supply shown in FIG. 1 is only an exemplary embodiment, and that transformer control system 30 may be used with other suitable aircraft power supplies and is not limited to this particular embodiment.

Transformer control system 30 is coupled to both the high-voltage and low-voltage sections 16, 18 of aircraft power supply 10, and can influence the DC power output by controlling the number of turns in primary windings 40. According to the exemplary embodiment shown here, transformer control system 30 generally includes a control circuit 100, switch circuit 102, and winding taps or terminals 108-112. Control circuit 100 gathers DC power feedback and, depending on that feedback, can manipulate the number of turns in primary windings 40 by selectively turning switch circuit 102 'on' and 'off' and thereby shorting certain winding turns in the process. By shorting different winding turns, control circuit 100 can control the ratio of primary/secondary turns in transformer 22 and thus control the stepped-down transformation of power from high-voltage section 16 to low-voltage section 18.

Control circuit 100 is connected through feedback connections 112, 114 so that it can monitor one or more aspects of the DC power output, including the voltage level at DC power output 14. The control circuit can monitor the DC power output in real-time, which may be important in a closed-loop feedback arrangement, such as that shown here. According to an exemplary embodiment, control circuit 100 may include an application specific integrated circuit (ASIC) or any other suitable device known in the art and can employ a proportional closed-loop algorithm to control the state of switch circuit 102 in response to the voltage sensed at DC power output 14.

Figure 2:
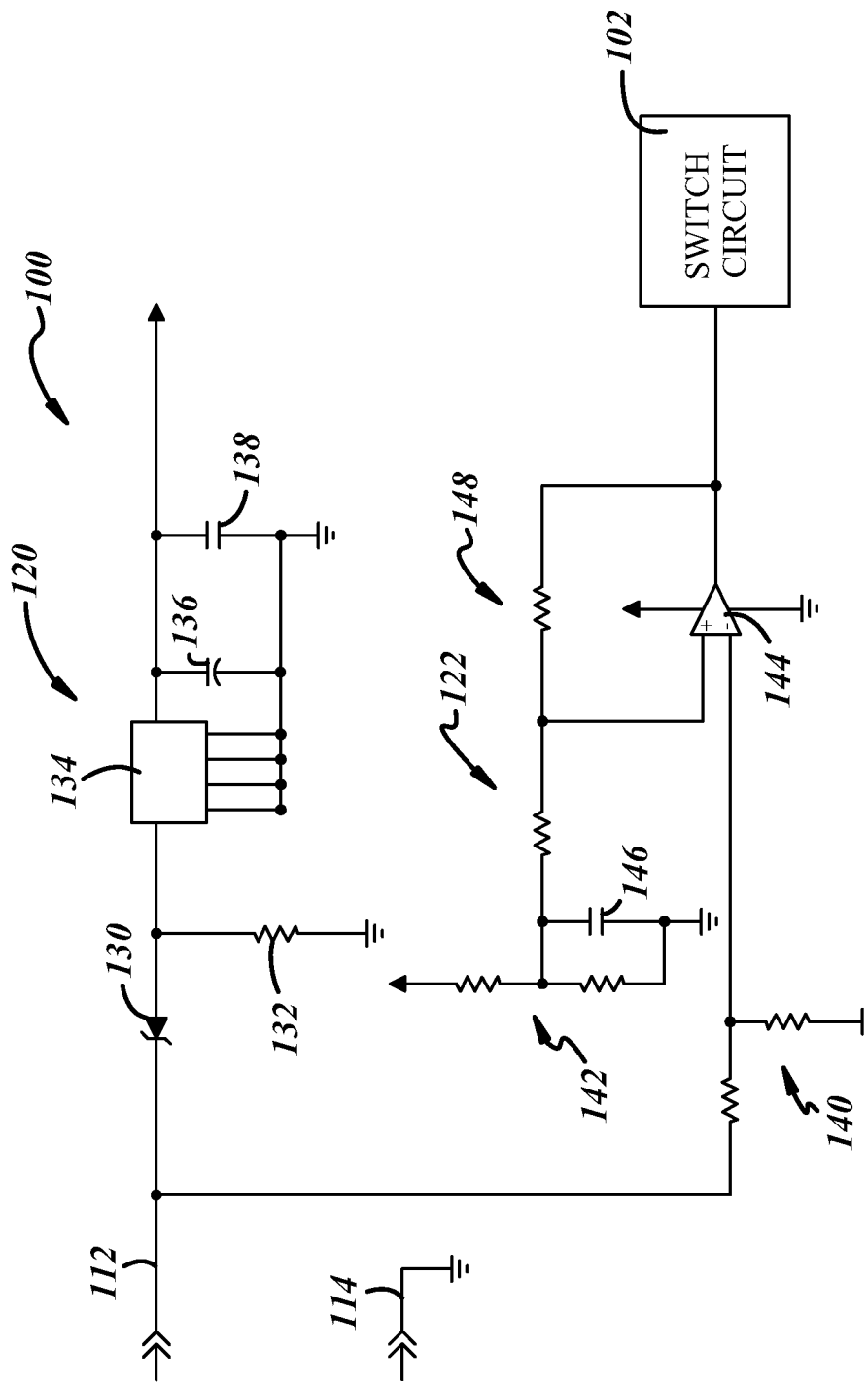
FIG. 2 is a schematic view of an exemplary control circuit that can be used with the aircraft power supply of FIG. 1.

Turning to FIG. 2, there is shown an exemplary embodiment of a suitable control circuit 100 which in this embodiment includes a voltage regulator 120 and a voltage comparator 122. Voltage regulator 120 is designed to provide a steady and consistent reference voltage for the control circuit, such as 5 VDC, as well as any other circuits that require such a reference voltage. In the exemplary embodiment shown in FIG. 2, voltage regulator 120 includes a zener diode 130, resistor 132, regulator 134, and capacitors 136, 138. Feedback connection 112 is connected to zener diode 130 (e.g., 12 V breakdown voltage), which in turn is connected to regulator 134. Zener diode 130 and resistor 132 reduce the input voltage to provide a "lock-out" feature so that control circuit 100 does not undesirably affect transformer primary windings 40 via driver and Triac circuitry included within switch circuit 102, as will be understood by those skilled in the art. The reduced input voltage (e.g., 5 VDC) will also reduce the power dissipated by regulator 134. It should be understood that other voltage regulators could be used and that control circuit 100 is not limited to the exemplary embodiment shown here.

Voltage comparator 122 compares the voltage of DC power output 14 to a reference voltage provided by voltage regulator 120 and, depending on the outcome of that comparison, controls the state of switch circuit 102. In the exemplary shown here, voltage comparator 122 includes voltage dividers 140, 142, a comparator 144, a capacitor 146, and a hysteresis feature 148. Voltage divider 140 is connected to feedback connection 112 and drops the voltage on that connection from about 28 VDC to a lower level; for example, 2-3 VDC. Voltage divider 140 provides a voltage (the input voltage) that is dependent on the DC power output 14 and is connected to the inverting input of comparator 144. Voltage divider 142, on the other hand, is provided with a consistent voltage from voltage regulator 120 and provides a voltage (the reference voltage) to the non-inverting input of comparator 144. Capacitor 146 may provide filtering for the reference voltage. Hysteresis feature 148, which may include one or more resistors in a feedback loop of the comparator, can retard the effect of the input voltage crossing the threshold of the reference voltage. This, in turn, can prevent comparator 144 from rapidly switching states or oscillating back and forth when the input voltage crosses the threshold point of the reference voltage. Again, the voltage comparator embodiment described above is only exemplary. Other voltage regulator arrangements, including ones having additional comparators for reducing switching or input noise for example, could be used with control circuit 100.

Switch circuit 102 can be used to control the number of turns in primary windings 40 by selectively shorting turns in response to signals from control circuit 100. As shown in FIG. 1, switch circuit 102 is connected to winding taps 108-112 and to neutral line 104 on the other side. According to one embodiment, switch circuit 102 may include solid-state switches that are of a Triac, MOSFET or IGBT design, although others could also be used. When control circuit 100 closes one of these switches, a ground path is created between the shorted winding tap 108-112 and neutral line 104 so that the remaining down-stream turns in the primary winding are shunted. By shorting certain turns in primary winding 40, the ratio of turns between the primary and secondary windings can be manipulated, as well as the stepped down voltage. In one embodiment, switch circuit 102 is designed so that if one or more switches malfunction, the default switch position is 'off' or 'open' which causes all of the turns in the corresponding winding to be active.

During operation, the power supplied to DC power output 14 can fluctuate in response to the electrical power demand or load. For example, the DC power is nominally around 28 VDC, but may rise to about 33 VDC during no load conditions and can drop to about 26 VDC during heavy load conditions (e.g., when output current >50 amps). This can result in a voltage swing of about 7 VDC or more around a nominal DC voltage, and can introduce a ripple voltage in the DC power that is typically about 1.5 Vp-p (volts peak-to-peak). Although this ripple voltage may meet applicable requirements like MIL-STD 704, it could undesirably affect certain electrical components in the aircraft. Furthermore, some aircraft have multiple DC power supplies that are independent from one another to provide redundancy. If one DC power supply fails or otherwise experiences a reduced voltage level, the others can fill in. This too can cause variations in the DC power, particularly when switching between DC power supplies.

Figure 3:
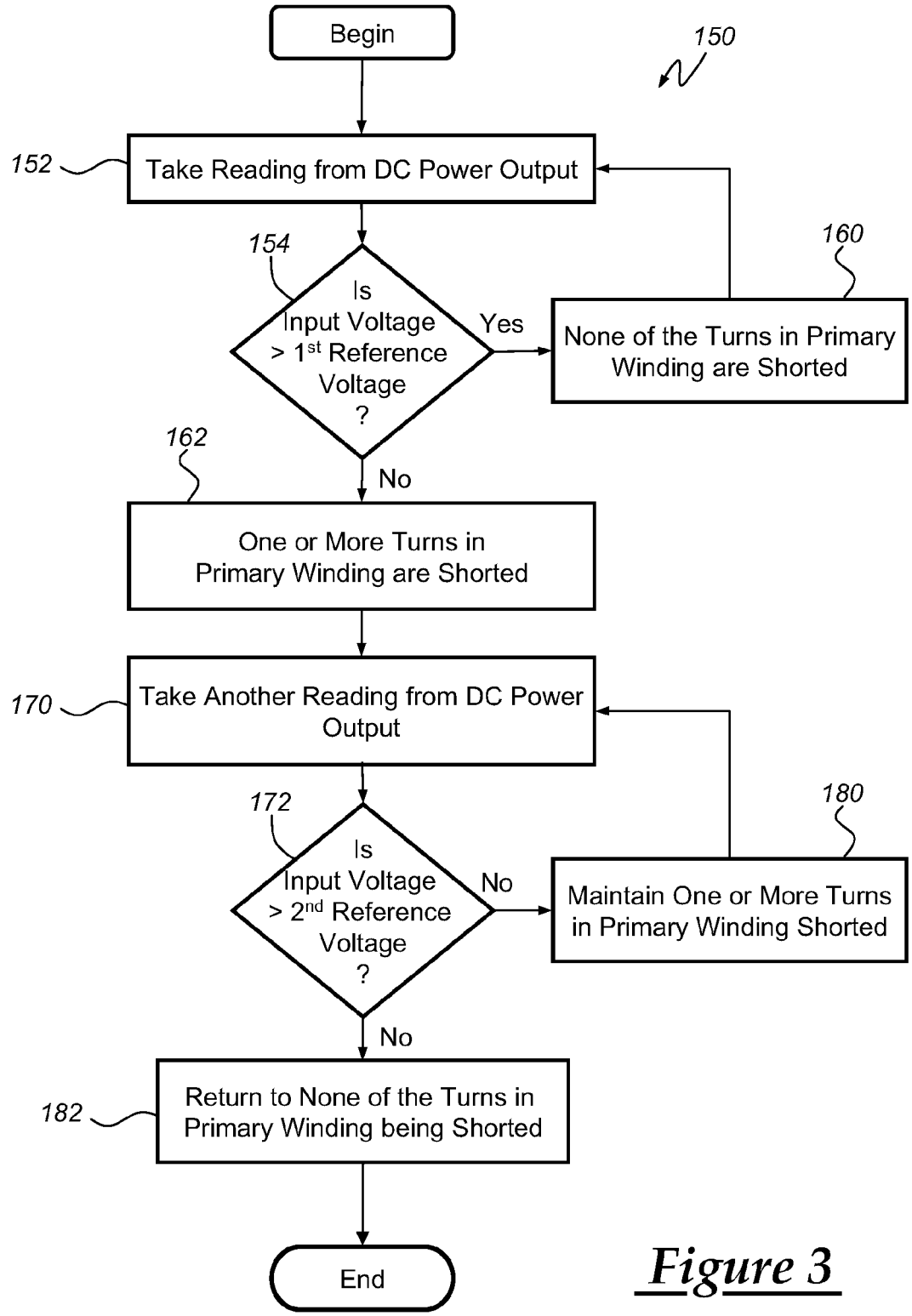
FIG. 3 is a flowchart illustrating some of the steps of a method for operating an aircraft power supply such as is shown in FIG. 1.

FIG. 3 is a basic flowchart of an exemplary method 150 for operating an aircraft power supply, such as the one shown in FIG. 1. Although the following description is provided in the context of a DC power supply that becomes heavily loaded by various aircraft electrical components, it should be appreciated that the aircraft power supply described herein could be used in a variety of other situations. Beginning with step 152, transformer control system 30 takes a reading from the DC power output and senses one or more characteristics, such as voltage level, current, load, etc. In one embodiment, control circuit 100 is connected to DC power output 14 via feedback connections 112, 114 and senses the voltage level of the DC power output through these connections. It is possible for control circuit 100 to sense other DC power characteristics in addition to or in lieu of the voltage reading, and it can do so by taking readings at locations other than power output 14, for example. At this point, the various switches in switch circuit 102 may be in an 'off' or 'open' position such that primary winding 40 operates with its full number of turns.

Next, step 154 compares one or more of the sensed DC power characteristic to a first predetermined level, which could be based on a variety of parameters. For example, the first predetermined level could be an absolute voltage level (e.g., 26.5 VDC or some AC voltage level), an absolute current level (e.g., 200 amps), a relative load level (e.g., 50% of a max current usage), etc. The preceding examples are only some of the possibilities, as other comparisons and predetermined levels could also be used. In an exemplary embodiment, step 154 compares the input voltage (e.g., the voltage derived from DC power output 14) to a first reference voltage (e.g., a reference voltage derived from a target voltage of 26.5 VDC). If the input voltage is greater than the first reference voltage, then none of the turns in primary winding 40 are shorted and the turns ratio of transformer 22 is kept the same, step 160. Control of the method is returned to step 152 for continued monitoring. If, however, the input voltage is less than the first reference voltage—thus, signaling an undesirable voltage decrease on DC power output 14—then control circuit 100 can generate a control signal that causes one or more turns in primary winding 40 to be shorted, and thereby change the turns ratio of the transformer, step 162.

In an exemplary embodiment, steps 154-162 can be performed by using the voltage comparator 122 that is shown in FIG. 2. More specifically, if the input voltage that is applied to the inverting input of comparator 144 is greater than the first reference voltage applied to the non-inverting input, then the comparator generates a control signal that is 'low'. This control signal is sent to switch circuitry 102 and causes the switches associated with winding taps 108-112 to remain 'off', step 160. With the switches off, each of the primary windings operates in a normal mode where all of the turns of the primary windings are being used. If, however, the input voltage to comparator 144 is less than the first reference voltage, then the comparator generates a 'high' control signal that is sent to switch circuitry 102, step 162. This high signal can turn on the various Triacs or other types of switches, which in turn short some of the turns in each of the primary windings. By shorting or shunting some of the primary turns, the turns ratio is manipulated so that a higher voltage is induced in secondary windings 42, 44. This enables aircraft power supply 10 to compensate for a decrease in the DC power output 14 due to high output loads, low input voltages, or any other factors that can draw down DC power output 14. Again, this is only an exemplary way of operating transformer control system 30, as other methods and techniques could be employed.

Step 170 then takes another reading of the DC power and again senses one or more DC power characteristics. In an example where the DC voltage level is again sensed and used in the comparison, step 172 can compare an input voltage (e.g., one taken from DC power output 14) to a second reference voltage, such as 28.9 VDC. As previously explained, a variety of DC power characteristics and predetermined levels could be used. If the sensed voltage is less than 28.9 VDC, for example, then control circuit 100 determines that the DC power output is in a suitable range and no adjustments to the turns ratio are needed, step 180. Thus, control passes back to step 170 for continued monitoring. If, however, the sensed voltage is greater than or equal to 28.9 VDC, then control circuit 100 may determine that the load on the DC power supply has subsided enough that it can turn the switches in switch circuit 102 'off' again, step 182. Turning the switches 'off' opens the switches and returns the primary winding 40 to a condition where none of the turns are being shorted (that is, it un-shorts the turns of the winding); this has the effect of decreasing the stepped-down voltage induced in secondary windings 42, 44, as already explained.

Following step 182, method 150 may return to step 152 for additional readings and continued monitoring. Although not schematically shown in FIG. 3, method 150 could use any number of different ways to stop or exit the method. For example, method 150 could continue until it is determined that one or more parts of the aircraft's electrical systems have been turned off; at which point method 150 could terminate. Other approaches could be used as well.

In a different embodiment, different switches in switch circuit 102 may be operated independently of each other, instead of being closed and opened in unison. In the embodiment described above, the switches of switch circuit 102 are operated together so that the power induced in secondary windings 42, 44 is balanced. If the predetermined level used in step 154 is 26.5 VDC, for example, then closing the switches could increase the voltage level of the DC power to about 28-29 VDC. This is, of course, dictated by the number of turns that are shorted, as well as other parameters. In a different embodiment, transformer control system 30 could be designed to control the state at each of the winding taps 108-112 independently. This would provide the system with the ability to selectively control the turns ratio between individual primary windings and their corresponding secondary windings.

In another embodiment, a single primary winding could be provided with multiple winding taps. For example, the first primary winding shown in FIG. 1 with winding tap 108 could be provided with two, three or more winding taps so that the turns ratio could be controlled in a more precise manner. It is also possible for transformer control system 30 to be connected so that it selectively shorts turns in one or more of the secondary windings 42, 44. The method and system described above is not limited to manipulating turns in the primary windings only. Other embodiments could also be used for controlling or manipulating the turns ratio of transformer 22.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "like" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. An aircraft power supply, comprising:
   a transformer having at least one primary winding and at least one secondary winding, each of which includes a number of turns, wherein the transformer receives input power that is supplied to the primary winding and wherein the secondary winding is coupled to an output of the aircraft power supply; and
   a transformer control system coupled to the transformer, wherein the transformer control system includes a switch circuit having one or more switches that control the number of turns being used in at least one of the windings by selectively shorting or unshorting one or more of the turns, and further wherein the aircraft power supply is operable in a plurality of modes to provide power to the output via the transformer, the plurality of modes comprising one mode in which all of the one or more switches of the switch circuit are open, and another mode in which one or more of the switches are closed.

2. An aircraft power supply as defined in claim 1, further comprising a rectifier connected to receive power from the one or more secondary windings, whereby the aircraft power supply is an AC to DC converter.

3. An aircraft power supply as defined in claim 2, wherein the transformer comprises a step-down transformer and wherein the transformer control system is operable to control the number of turns being used in at least one of the windings so that the rectifier outputs a voltage of about 28 VDC.

4. An aircraft power supply as defined in claim 1, wherein the transformer comprises three primary windings with the transformer control system being connected to a tap in each of the primary windings.

5. An aircraft power supply as defined in claim 1, wherein the transformer control system includes a control circuit receiving feedback indicative of the voltage outputted by the one or more secondary windings, and wherein the switch circuit is connected between the control circuit and at least one particular winding such that the switch circuit selectively shorts one or more turns of the particular winding under based on the feedback received by the control circuit.

6. An aircraft power supply as defined in claim 5, wherein the control circuit includes a comparator that compares the feedback with a first reference voltage and shorts the one or more turns when the feedback crosses the first reference voltage, and wherein, when the one or more turns are shorted, the control circuit compares the feedback to a second reference voltage that is different than the first reference voltage and un-shorts the one or more turns when the feedback crosses the second reference voltage, whereby the control circuit exhibits a hysteresis characteristic in the shorting and un-shorting of the windings.

7. A method of operating an aircraft power supply, comprising the steps of:
   converting an AC input to a DC output using a transformer;
   sensing a characteristic from the output side of the transformer that is representative of the DC output;
   comparing the sensed characteristic to a reference characteristic; and
   shorting one or more turns of a transformer based on the comparison.

8. A method as defined in claim 7, wherein the characteristic is voltage and the transformer is a step-down transformer having a turns ratio, and wherein the shorting step further comprises decreasing the turns ratio if the sensed voltage is below the reference voltage.

9. A method as defined in claim 7, wherein the shorting step further comprises shorting one or more turns of a primary winding of the transformer.

10. A method as defined in claim 9, wherein the shorting step further comprises shorting one or more turns of each of three primary windings of the transformer.

11. A method as defined in claim 7, wherein the sensing step further comprises sensing a voltage by reading the DC output using a control circuit and wherein the shorting step further comprises activating a switch circuit to selectively short one or more turns of at least one winding of the transformer based on the voltage level of the sensed voltage.

12. A method as defined in claim 11, wherein the reference characteristic comprises a first reference voltage and wherein the method further comprises the step of subsequently comparing the sensed voltage with a second reference voltage that is different than the first reference voltage and un-shorting the one or more turns when the sensed voltage crosses the second reference voltage, whereby the aircraft power supply includes a hysteresis characteristic that involves shorting the one or more turns when the sensed voltage crosses the first reference voltage and un-shorting the one or more turns when the sensed voltage crosses the second reference voltage.

13. An aircraft power supply, comprising:
   a transformer having a primary winding that receives power from an input of the aircraft power supply and a secondary winding that supplies power to an output of the aircraft power supply, wherein each of the windings includes a number of turns; and
   a transformer control system coupled to the transformer, wherein the transformer control system comprises a switch circuit having one or more switches that control the number of turns being used in at least one of the windings, the switch circuit being connected to the transformer such that a continuous current loop exists from the input through the primary winding that does not include the switch circuit and such that a continuous current loop exists from the output through the secondary winding that does not include the switch circuit; and further wherein the aircraft power supply is operable in a plurality of modes to provide power to the output via the transformer, the plurality of modes comprising one mode in which all of the one or more switches of the switch circuit are open, and another mode in which one or more of the switches are closed.

* * * * *